US012691553B2

(12) United States Patent
Brooks

(10) Patent No.: US 12,691,553 B2
(45) Date of Patent: Jul. 28, 2026

(54) BEAM CLAMP INSTALLATION TOOL

(71) Applicant: Justen Brooks, Waco, TX (US)

(72) Inventor: Justen Brooks, Waco, TX (US)

( * ) Notice: Subject to any disclaimer, the term of this patent is extended or adjusted under 35 U.S.C. 154(b) by 303 days.

(21) Appl. No.: 18/675,267

(22) Filed: May 28, 2024

(65) Prior Publication Data

US 2025/0367795 A1 Dec. 4, 2025

(51) Int. Cl.

*B25B 13/48* (2006.01)
*B25B 5/10* (2006.01)
*B25B 5/14* (2006.01)
*B25B 23/16* (2006.01)

(52) U.S. Cl.

CPC ................ *B25B 13/48* (2013.01); *B25B 5/10* (2013.01); *B25B 5/14* (2013.01); *B25B 23/16* (2013.01)

(58) Field of Classification Search

CPC . B25B 13/48; B25B 23/0007; B25B 23/0021; B25B 23/0035; B25B 5/10; B25B 5/14; B25G 1/04; B25G 1/043

See application file for complete search history.

(56) References Cited

U.S. PATENT DOCUMENTS

| | | | | |
|---|---|---|---|---|
| 4,856,388 | A * | 8/1989 | Freeman | B25G 1/043 81/177.2 |
| 2007/0120025 | A1* | 5/2007 | Wilson | B25B 5/101 248/125.7 |
| 2013/0056590 | A1* | 3/2013 | Kennedy | A62C 35/68 248/62 |
| 2020/0055180 | A1* | 2/2020 | Calvert | B25J 1/04 |
| 2020/0164491 | A1* | 5/2020 | Flory | B25B 13/065 |
| 2022/0316506 | A1* | 10/2022 | Luscombe | F16B 45/002 |
| 2024/0328442 | A1* | 10/2024 | Luscombe | F16B 45/002 |
| 2024/0391062 | A1* | 11/2024 | Schonberg | B25B 13/06 |
| 2025/0073887 | A1* | 3/2025 | Summers | B25G 1/043 |

* cited by examiner

*Primary Examiner* — David B. Thomas
(74) *Attorney, Agent, or Firm* — Bruce A. Lev

(57) ABSTRACT

A beam clamp installation tool including an elongated handle having socket members attached on opposite ends thereof adapted such that one socket member is sized and shaped to engage the head of the set screw of a beam clamp and the other socket member is sized and shaped to engage the jam nut located upon the set screw of the beam clamp. In use, installation of the beam clamp is made easier and less dangerous since the person installing the beam clamp does not have to use a ladder or elevated work platform, nor use multiple tools.

15 Claims, 6 Drawing Sheets

BEAM CLAMP INSTALLATION TOOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to tools for the installation of beam clamps, and more specifically to tools designed to engage the set screw and jam nut of a beam clamp.

2. Description of the Related Art

Prior art beam clamps and tools for engaging and adjusting beam clamps upon beams of a structure are hand-held and usually require a ladder or an elevated work platform for the user to reach a beam that a beam clamp is adapted to be installed upon. The main problem is that it requires a level of danger for the user to stand near the top of a ladder or on top of an elevated work platform and reach above their heads to engage and install the beam clamp upon a ceiling beam. Furthermore, it requires two types of socket members to engage the different shapes and sizes of the head of the set screw and the jam nut of the beam clamp. As such a user needs to carry both sockets and a tool up and to the top of the ladder or elevated work platform and change sockets while on top of the ladder or elevated work platform, which increases the chances of falling off the ladder or elevated work platform and suffering injuries.

Accordingly, the present invention overcomes the disadvantages associated with the prior art, by providing a beam clamp installation tool including an elongated handle having socket members attached on opposite ends thereof adapted such that one socket member is sized and shaped to engage the head of the set screw of a beam clamp and the other socket member is sized and shaped to engage the jam nut located upon the set screw of the beam clamp. Such that when in use, installation of the beam clamp is made easier and less dangerous since the person installing the beam clamp does not have to use a ladder or multiple tools.

BRIEF SUMMARY OF THE INVENTION

In view of the foregoing disadvantages inherent in the known types of tools for installing beam clamps or the like in the prior art, the present invention provides an improved beam clamp installation tool. As such, the general purpose of the present invention, which will be described subsequently in greater detail, is to provide a beam clamp installation tool including an elongated handle having socket members attached on opposite ends thereof adapted such that one socket member is sized and shaped to engage the head of the set screw of a beam clamp and the other socket member is sized and shaped to engage the jam nut located upon the set screw of the beam clamp. In use, installation of the beam clamp is made easier and less dangerous since the person installing the beam clamp does not have to use a ladder or elevated work platform, nor use multiple tools, with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

Figure 1:
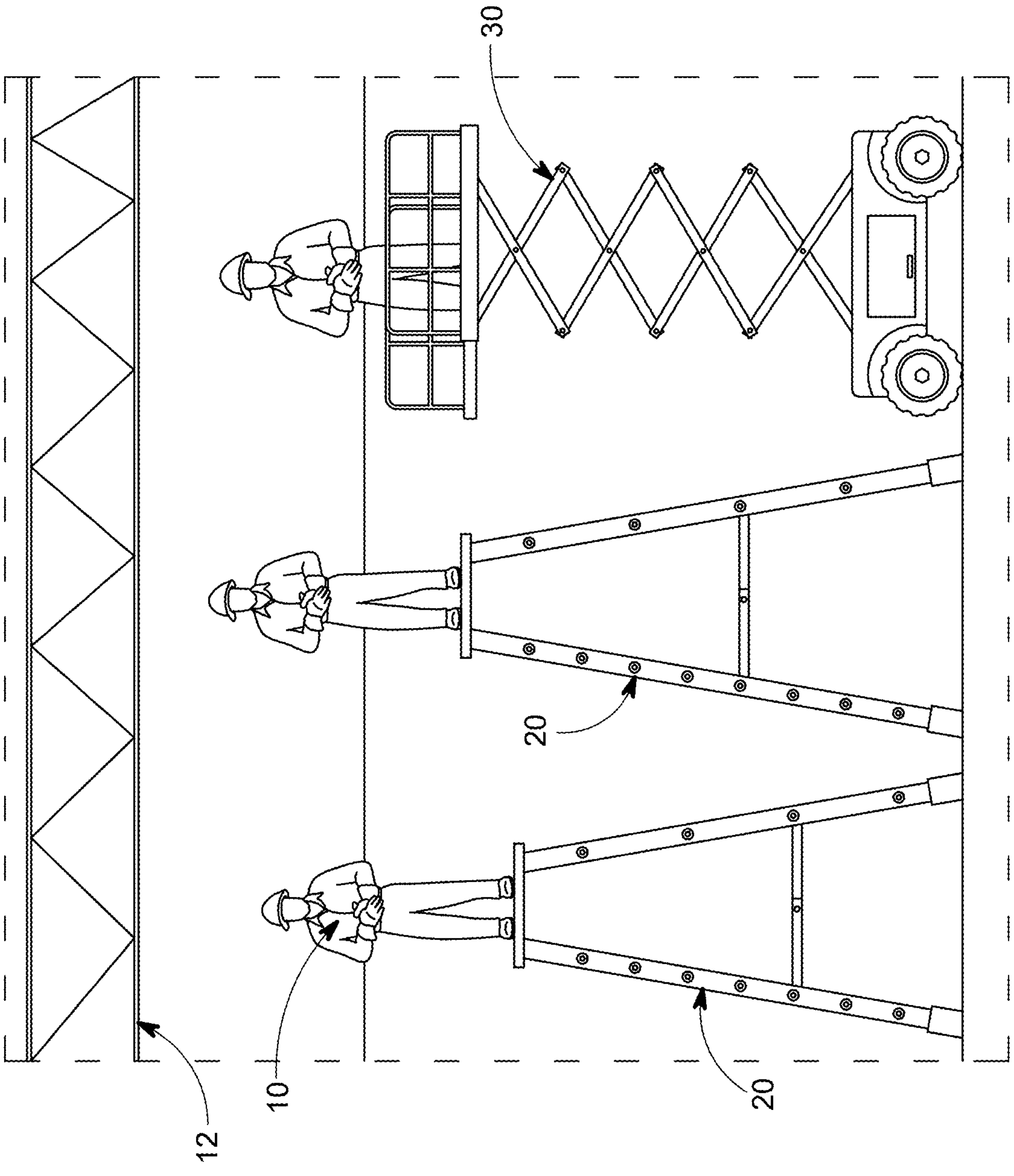
FIG. 1 (PRIOR ART)
FIG. 1 shows a side view of prior art configurations for a user 10 to install a beam clamp upon a beam 12 of a building structure using ladders 20 and elevated work platforms 30.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

The beam clamp installation tool 100 includes an elongated handle 110 having socket members (120 and 130) attached on opposite ends thereof adapted such that one socket member is sized and shaped to engage the head of the set screw 250 of a beam clamp 200 and the other socket member is sized and shaped to engage the jam nut 260 upon the set screw of the beam clamp. The elongated handle 110 can be formed from ½" EMT conduit, which is readily available on nearly all job sites. The conduit is then cut to the necessary length for beam clamp installation. The socket members are then slip fit over the piece of conduit on opposite ends thereof and securely attached using thumb screws. One socket member includes a square opening 150 adapted to fit upon and turn the head of the set screw 250 of the beam clamp until the beam clamp is secured to the beam, and the other socket member includes a hexagonal shape 152 adapted to fit upon and turn the jam nut 260 of the beam clamp until securely holding the set screw 250 in place.

The beam clamp 200 includes a threaded rod 280, which is used to hang ceiling structural members therefrom. In use, the beam clamp 200, with the threaded rod 280 attached, is placed upon the first end of the elongated handle 110 that includes the socket member 120 having the square opening. The set screw 250 of the beam clamp is placed within the square opening 150 of the first socket member 120 and the beam clamp and threaded rod are then elevated up to the beam 300 using the elongated handle 110 until it is properly in place upon the beam flange 310. The elongated handle 110 is then rotated, which in turn rotates the socket member 120 and the set screw 250 until the beam clamp 200 is tightened upon the beam flange 310. The beam clamp installation tool 100 is then flipped around and the second socket member 130 that includes the socket member having the hexagonal opening 152 is then used to engage and rotate the jam nut 260 upon the set screw 250 until in contact with the beam flange 310, thereby connecting and holding the beam clamp 200 securely to the beam 300.

Figure 2:
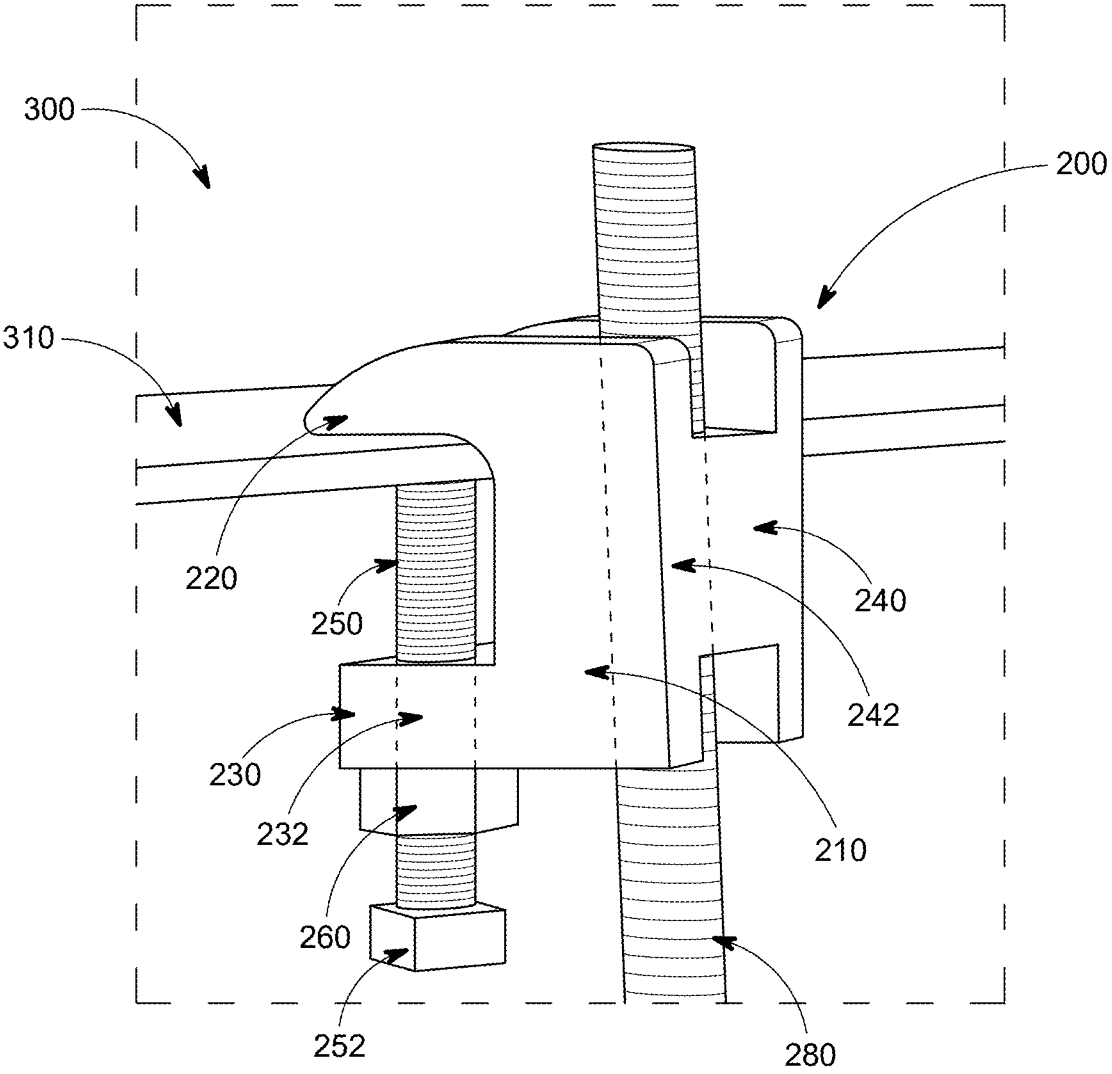
FIG. 2 shows a perspective view of the beam clamp installed upon a beam of a building according to the preferred embodiment of the present invention.
Figure 3:
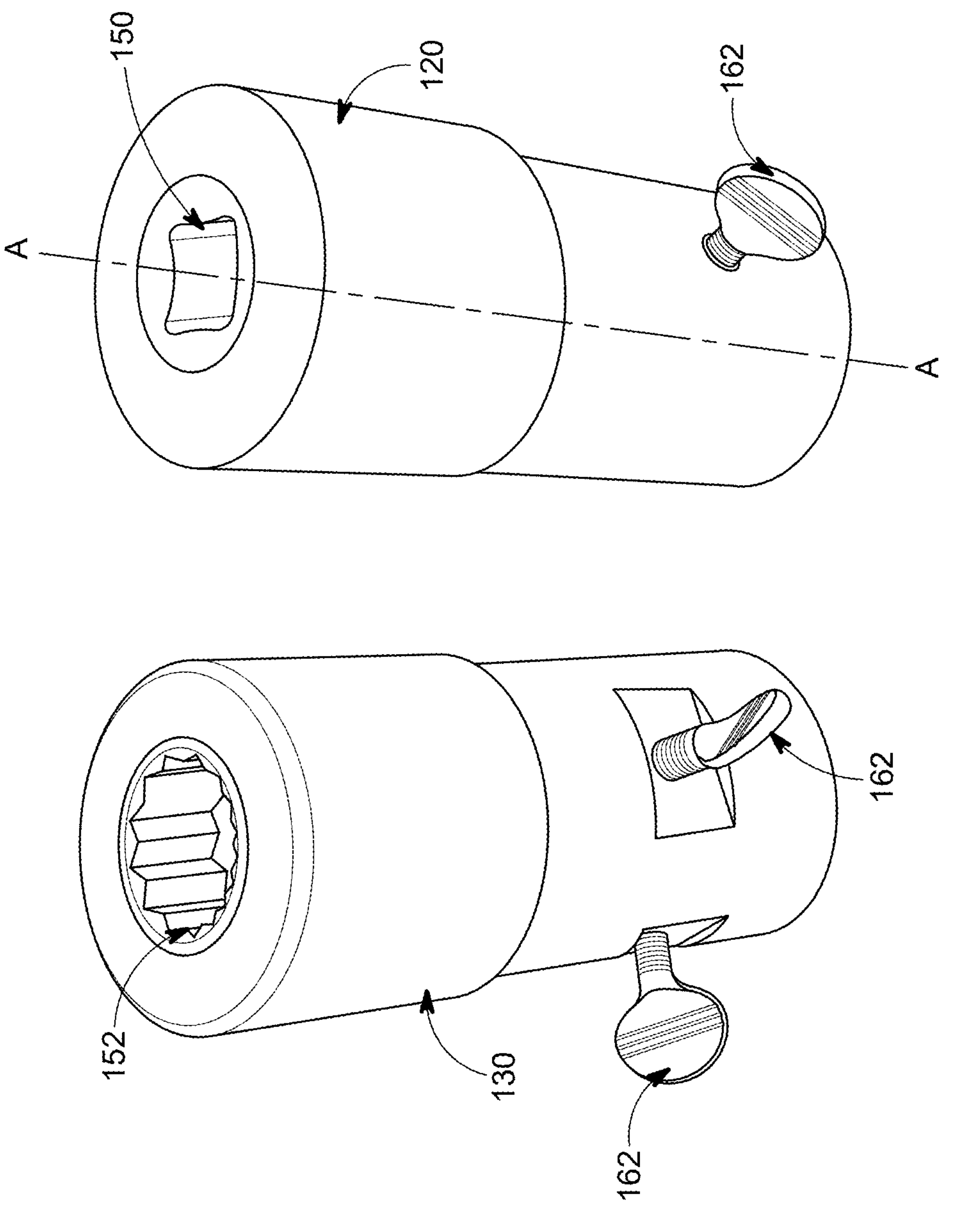
FIG. 3 shows a perspective view of both the first and second socket members according to the preferred embodiment of the present invention.
Figure 4:
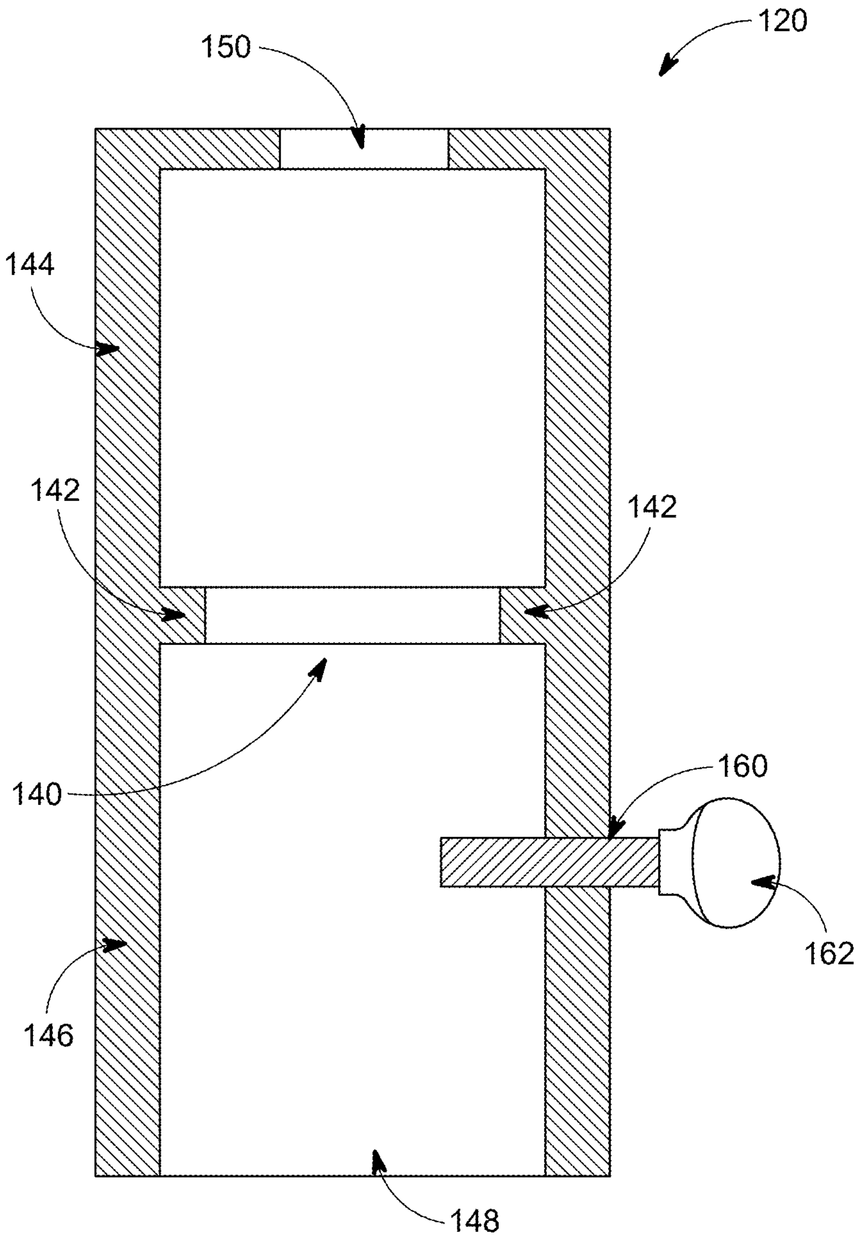
FIG. 4 shows a vertical cross-sectional view of a socket member according to the preferred embodiment of the present invention shown in FIG. 3.
Figure 5:
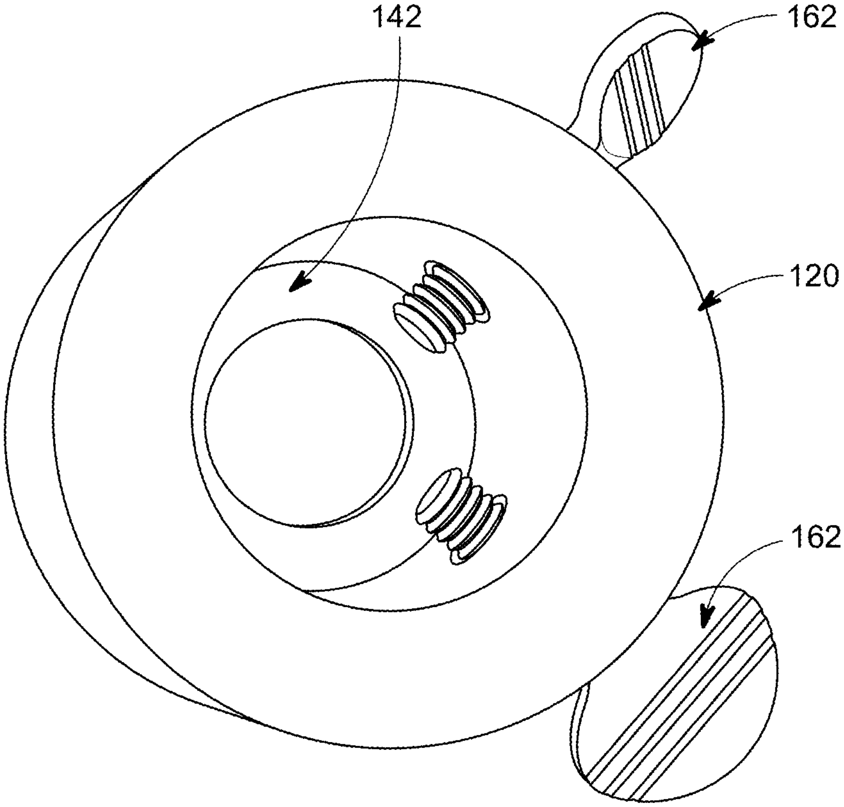
FIG. 5 shows a bottom perspective view of a socket member according to the preferred embodiment of the present invention of FIG. 3.
Figure 6:
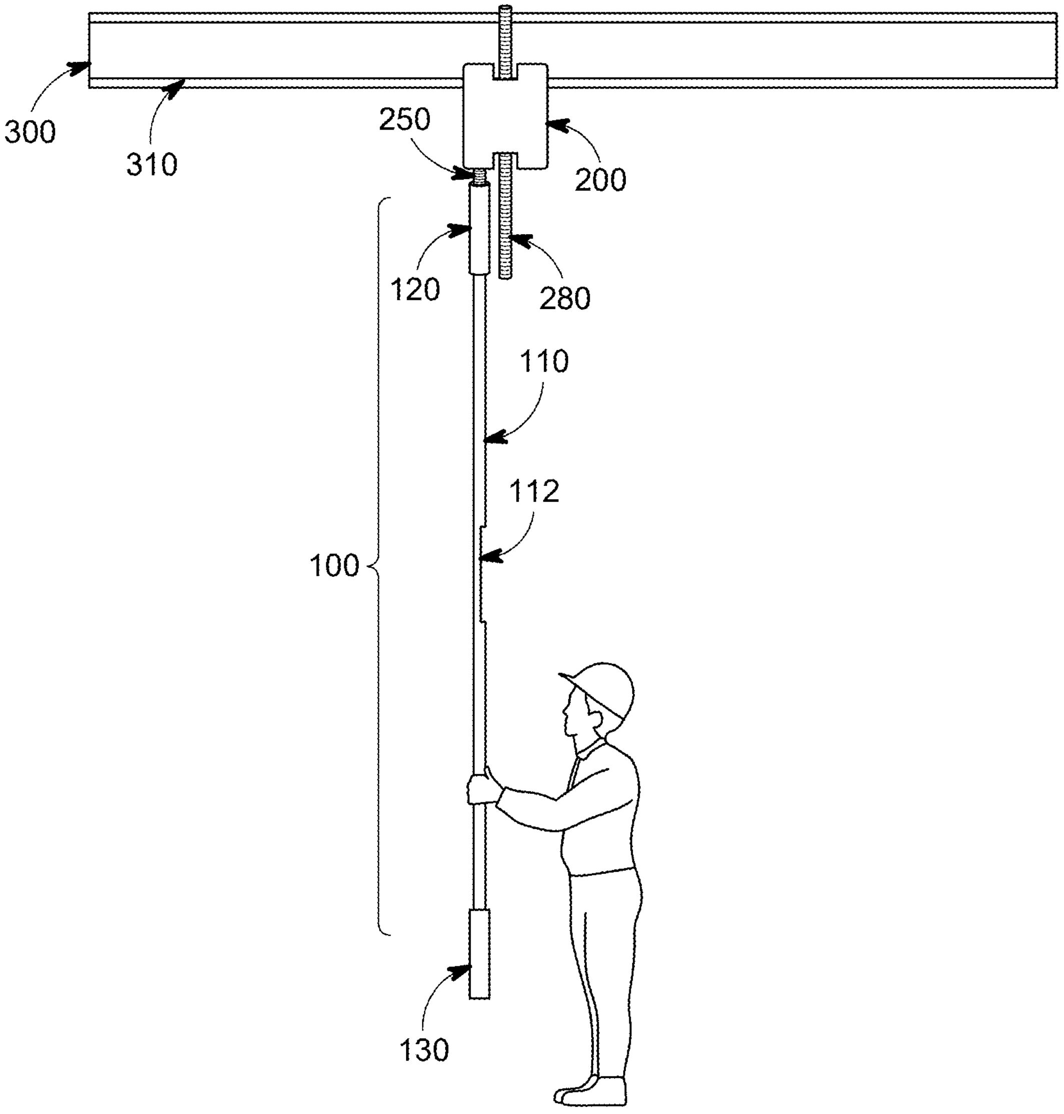
FIG. 6 shows a side view of a person installing a beam clamp using the beam clamp installation tool according to the preferred embodiment of the present invention.

Turning now to the preferred embodiment shown in FIGS. 2-6, the present invention discloses a beam clamp installation tool 100 for use with a beam clamp 200.

The beam clamp 200 comprises a C-shaped main body 210 including an upper clamping portion 220, a lower clamping portion 230 including a threaded set screw aperture 232 therethrough, and a center clamping portion 240 including a threaded rod aperture 242 therethrough, wherein the center clamping portion is connected between the upper clamping portion and the lower clamping portion, and an elongated threaded set screw 250 including an elongated threaded body portion and a square-shaped head 252, wherein the elongated threaded set screw is adapted to rotatably engage with the threaded set screw aperture of the lower clamping portion, and wherein when rotated, an end portion of the elongated threaded body portion of the elongated threaded set screw is adapted to releasably contact a flange portion 310 of a ceiling beam 300, and a threaded jam nut 260 formed having hexagonal shape, wherein the threaded jam nut is adapted to be located upon the elongated threaded body portion of the elongated threaded set screw and in between the square-shaped head of the elongated threaded set screw and a lower surface of said lower clamping portion. The C-shaped main body 210 is adapted to surround the flange portion 310 of the ceiling beam 300 and clamp the flange portion of the ceiling beam in between the end portion of the elongated threaded body portion of the elongated threaded set screw and a lower surface of the upper clamping portion of the C-shaped main body, and wherein after the C-shaped main body is clamped to the flange portion of the ceiling beam the threaded jam nut is adapted to be rotated until making contact with the lower surface of the lower clamping portion, thereby jamming and securely holding the elongated threaded set screw in place upon the flange portion of the ceiling beam.

The beam clamp installation tool 100 comprises an elongated handle 110 including a first end, a second end, and an elongated middle section; a first socket member 120 including a hollow center section 140 sized and shaped to fit over and engage the first end of the elongated handle, a center annular ring 142 formed within the hollow center section and forms and defines an upper end portion 144 of the first socket member and a lower end portion 146 of the first socket member, and wherein the center annular ring is sized and shaped to contact the first end of the elongated handle and prevent the elongated handle from moving further into the hollow center section, a cylindrical opening 148 through the lower end portion thereof adapted to fit upon the first end of the elongated handle, a square-shaped opening 150 through the upper end portion thereof, at least one threaded set screw aperture 160 located through a side wall of the lower end portion, and at least one threaded set screw 162 adapted to engage respective said at least one threaded set screw aperture, and is adapted to engage the first end of the elongated handle to releasably secure the first socket member thereto; a second socket member 130 including a hollow center section 140 sized and shaped to fit over and engage the second end of the elongated handle, a center annular ring 142 formed within the hollow center section and forms and defines an upper end portion 144 of the second socket member and a lower end portion 146 of the second socket member, and wherein the center annular ring is sized and shaped to contact the second end of the elongated handle and prevent the elongated handle from moving further into the hollow center section, a cylindrical opening 148 through the lower end portion thereof adapted to fit upon the second end of the elongated handle, a hexagonally-shaped opening 152 through the upper end portion thereof, at least one threaded set screw aperture 160 located through the side wall of said lower end portion, and at least one threaded set screw 162 adapted to engage respective the at least one threaded set screw aperture, and is adapted to engage the second end of the elongated handle to releasably secure the second socket member thereto, wherein the first socket member is releasably attached to the first end of the elongated handle, and the second socket member is releasably attached to the second end of the elongated handle.

When in use, the first socket member 120 is used to engage the square head 252 of the set screw 250 of the beam clamp 200 via the square-shaped opening 150, then the beam clamp installation tool 100 is used to lift the beam clamp up to and engage the beam 300 of a building structure, then the beam clamp installation tool 100 is rotated in order to rotate the set screw 250 of the beam clamp until the beam clamp is engaged with the beam of the building structure, then the beam clamp installation tool 100 is flipped around and the second socket member 130 is used to engage the hexagonal head of the jam nut 260 of the beam clamp 200 via the hexagonally-shaped opening 152, then the beam clamp installation tool 100 is rotated in order to rotate the jam nut 260 of the beam clamp 200 until the beam clamp is securely engaged with the beam 300 of the building structure.

The elongated handle 110 is substantially cylindrical along its length thereof, and the elongated middle section includes at least one flat section 112 adapted to allow a wrench to clamp thereto for turning the beam clamp installation tool and tightening the set screw and the jam nut of the beam clamp to chosen torques. Further, the elongated handle 110 can be formed from a metallic conduit having approximately a ½ inch diameter. Or more specifically, an electrical metallic tubing (EMT) having an inner diameter of 0.622 inches and an outer diameter of 0.706 inches. The first and second socket members (120 and 130) may be formed from hardened steel, though other strong materials may be used. The threaded set screws 162 of the first and second socket members may be formed as thumb screws, however, other variations of set screws can be used as well, including standard screwdriver forms and shapes.

In the preferred embodiment, the first and second socket members (120 and 130) respectively have two threaded set screw apertures 160 formed at a 90 degree angle to one another, and two respective threaded set screws 162 therein. Furthermore, the threaded jam nut 260 has an outer diameter larger than an outer diameter of the square-shaped head 252 of the elongated threaded set screw 250, and the hexagonally-shaped opening 152 of the second socket member 130 has a diameter larger than the outer diameter of the square-shaped head 252 of the elongated threaded set screw 250, such that the hexagonally-shaped opening of the second socket member, and as such the second socket member, can fit over the square-shaped head of the elongated threaded set screw and reach, engage, and turn the jam nut.

In scenarios when the diameter of the elongated handle 110 is larger than the diameters of the socket members being used, adapters may be included and connected to the opposite ends of the elongated handle and used to reduce the diameter thereof to fit within the socket members. As such, the adapters have a first section having at least one set screw adapted to fit over and be releasably secured to the ends of the elongated handle, a second section of a reduced diameter adapted to fit within the socket members being used, and a middle transition section in between the first and second sections.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A beam clamp installation tool for use with a beam clamp, comprising:
- an elongated handle comprising;
  - a first end;
  - a second end; and
  - an elongated middle section;
- a first socket member including:
  - a hollow center section;
    - wherein said hollow center section is sized and shaped to fit over and engage said first end of said elongated handle;
  - a center annular ring;
    - wherein said center annular ring is formed within said hollow center section and forms and defines an upper end portion of said first socket member and a lower end portion of said first socket member; and
    - wherein said center annular ring is sized and shaped to contact said first end of said elongated handle and prevent said elongated handle from moving further into said hollow center section;
  - a cylindrical opening through said lower end portion thereof;
    - wherein said cylindrical opening is adapted to fit upon said first end of said elongated handle;
  - a square-shaped opening through said upper end portion thereof;
  - at least one threaded set screw aperture;
    - wherein said at least one threaded set screw aperture is located through a side wall of said lower end portion; and
  - at least one threaded set screw;
    - wherein said at least one threaded set screw is adapted to engage respective said at least one threaded set screw aperture, and is adapted to engage said first end of said elongated handle to releasably secure said first socket member thereto;
- a second socket member including:
  - a hollow center section;
    - wherein said hollow center section is sized and shaped to fit over and engage said second end of said elongated handle;
  - a center annular ring;
    - wherein said center annular ring is formed within said hollow center section and forms and defines an upper end portion of said second socket member and a lower end portion of said second socket member; and
    - wherein said center annular ring is sized and shaped to contact said second end of said elongated handle and prevent said elongated handle from moving further into said hollow center section;
  - a cylindrical opening through said lower end portion thereof;
    - wherein said cylindrical opening is adapted to fit upon said second end of said elongated handle;
  - a hexagonally-shaped opening through said upper end portion thereof;
  - at least one threaded set screw aperture;
    - wherein said at least one threaded set screw aperture is located through said side wall of said lower end portion; and
  - at least one threaded set screw;
    - wherein said at least one threaded set screw is adapted to engage respective said at least one threaded set screw aperture, and is adapted to engage said second end of said elongated handle to releasably secure said second socket member thereto;
- wherein said first socket member is releasably attached to said first end of said elongated handle; and said second socket member is releasably attached to said second end of said elongated handle; and
- wherein when in use, said first socket member is used to engage the square head of a set screw of a beam clamp via said square-shaped opening, then said beam clamp installation tool is used to lift said beam clamp up to and engage a beam of a building structure, then said beam clamp installation tool is rotated in order to rotate said set screw of said beam clamp until said beam clamp is engaged with said beam of said building structure, then said beam clamp installation tool is flipped around and said second socket member is used to engage the hexagonal head of a jam nut of said beam clamp via said hexagonally-shaped opening, then said beam clamp installation tool is rotated in order to rotate said jam nut of said beam clamp until said jam nut is securely engaged with said beam clamp at a desired torque.

2. The beam clamp installation tool of claim 1, wherein said elongated handle is substantially cylindrical along its length thereof, and said elongated middle section includes at least one flat section adapted to allow a wrench to clamp thereto for turning said beam clamp installation tool and tightening said set screw and said jam nut of said beam clamp to chosen torques.

3. The beam clamp installation tool of claim 1, wherein said elongated handle is formed from a metallic material.

4. The beam clamp installation tool of claim 3, wherein said elongated handle is formed from an electrical metallic tubing having an inner diameter of 0.622 inches and an outer diameter of 0.706 inches.

5. The beam clamp installation tool of claim 1, wherein said first and second socket members are formed from hardened steel.

6. The beam clamp installation tool of claim 1, wherein said threaded set screws of said first and second socket members are formed as thumb screws.

7. The beam clamp installation tool of claim 1, wherein said first socket member has two threaded set screw apertures formed at a 90 degree angle to one another, and two respective threaded set screws; and wherein said second socket member has two threaded set screw apertures formed at a 90 degree angle to one another, and two respective threaded set screws.

8. A combination of a beam clamp and a beam clamp installation tool for use with said beam clamp, said combination comprising:
- a beam clamp comprising:
  - a C-shaped main body including:
    - an upper clamping portion;
    - a lower clamping portion including:
      - a threaded set screw aperture therethrough; and
    - a center clamping portion including:
      - a threaded rod aperture therethrough;
    - wherein said center clamping portion is connected between said upper clamping portion and said lower clamping portion; and
  - an elongated threaded set screw including:
    - an elongated threaded body portion; and
    - a square-shaped head;
    - wherein said elongated threaded set screw is adapted to rotatably engage with said threaded set screw aperture of said lower clamping portion; and
    - wherein when rotated, an end portion of said elongated threaded body portion of said elongated threaded set screw is adapted to releasably contact a flange portion of a ceiling beam; and
  - a threaded jam nut;
    - wherein said threaded jam nut is formed having hexagonal shape;
    - wherein said threaded jam nut is adapted to be located upon said elongated threaded body portion of said elongated threaded set screw and in between said square-shaped head of said elongated threaded set screw and a lower surface of said lower clamping portion;
  - wherein said C-shaped main body is adapted to surround said flange portion of said ceiling beam and clamp said flange portion of said ceiling beam in between said end portion of said elongated threaded body portion of said elongated threaded set screw and a lower surface of said upper clamping portion of said C-shaped main body; and
  - wherein after said C-shaped main body is clamped to said flange portion of said ceiling beam said threaded jam nut is adapted to be rotated until making contact with said lower surface of said lower clamping portion, thereby jamming and securely holding said elongated threaded set screw in place upon said flange portion of said ceiling beam; and
- a beam clamp installation tool comprising:
  - an elongated handle comprising;
    - a first end;
    - a second end; and
    - an elongated middle section;
  - a first socket member including:
    - a hollow center section;
      - wherein said hollow center section is sized and shaped to fit over and engage said first end of said elongated handle;
    - a center annular ring;
      - wherein said center annular ring is formed within said hollow center section and forms and defines an upper end portion of said first socket member and a lower end portion of said first socket member; and
      - wherein said center annular ring is sized and shaped to contact said first end of said elongated handle and prevent said elongated handle from moving further into said hollow center section;
    - a cylindrical opening through said lower end portion thereof;
      - wherein said cylindrical opening is adapted to fit upon said first end of said elongated handle;
    - a square-shaped opening through said upper end portion thereof;
    - at least one threaded set screw aperture;
      - wherein said at least one threaded set screw aperture is located through a side wall of said lower end portion; and
    - at least one threaded set screw;
      - wherein said at least one threaded set screw is adapted to engage respective said at least one threaded set screw aperture, and is adapted to engage said first end of said elongated handle to releasably secure said first socket member thereto;
  - a second socket member including:
    - a hollow center section;
      - wherein said hollow center section is sized and shaped to fit over and engage said second end of said elongated handle;
    - a center annular ring;
      - wherein said center annular ring is formed within said hollow center section and forms and defines an upper end portion of said second socket member and a lower end portion of said second socket member; and
      - wherein said center annular ring is sized and shaped to contact said second end of said elongated handle and prevent said elongated handle from moving further into said hollow center section;
    - a cylindrical opening through said lower end portion thereof;
      - wherein said cylindrical opening is adapted to fit upon said second end of said elongated handle;

a hexagonally-shaped opening through said upper end portion thereof;

at least one threaded set screw aperture;

wherein said at least one threaded set screw aperture is located through said side wall of said lower end portion; and at least one threaded set screw;

wherein said at least one threaded set screw is adapted to engage respective said at least one threaded set screw aperture, and is adapted to engage said second end of said elongated handle to releasably secure said second socket member thereto;

wherein said first socket member is releasably attached to said first end of said elongated handle; and said second socket member is releasably attached to said second end of said elongated handle; and wherein when in use, the first socket member is used to engage said square head of said set screw of said beam clamp via the square-shaped opening, then said beam clamp installation tool is used to lift said beam clamp up to and engage said beam of a building structure, then said beam clamp installation tool is rotated in order to rotate the set screw of said beam clamp until said beam clamp is engaged with said beam of said building structure, then said beam clamp installation tool is flipped around and said second socket member is used to engage said hexagonal head of said jam nut of said beam clamp via said hexagonally-shaped opening, then said beam clamp installation tool is rotated in order to rotate said jam nut of said beam clamp until said beam clamp is securely engaged with said beam of said building structure.

9. The combination of claim 8, wherein said elongated handle is substantially cylindrical along its length thereof, and said elongated middle section includes at least one flat section adapted to allow a wrench to clamp thereto for turning said beam clamp installation tool and tightening said set screw and said jam nut of said beam clamp to chosen torques.

10. The combination of claim 8, wherein said elongated handle is formed from a plastic material.

11. The combination of claim 10, wherein said elongated handle is formed from a ½ inch diameter plastic conduit.

12. The combination of claim 8, wherein said first and second socket members are formed from hardened steel.

13. The combination of claim 8, wherein said threaded set screws of said first and second socket members are formed as thumb screws.

14. The combination of claim 8, wherein said first socket member has two threaded set screw apertures formed at a 90 degree angle to one another, and two respective threaded set screws; and wherein said second socket member has two threaded set screw apertures formed at a 90 degree angle to one another, and two respective threaded set screws.

15. The combination of claim 8, wherein said threaded jam nut has an outer diameter larger than an outer diameter of said square-shaped head of said elongated threaded set screw, and said hexagonally-shaped opening of said second socket member has a diameter larger than said outer diameter of said square-shaped head of said elongated threaded set screw, such that said hexagonally-shaped opening of said second socket member, and as such said second socket member, can fit over said square-shaped head of said elongated threaded set screw and reach, engage, and turn said jam nut.

* * * * *